United States Patent [19]

Hargus et al.

[11] Patent Number: 5,039,340
[45] Date of Patent: Aug. 13, 1991

[54] CERAMIC FOAM AND A PROCESS FOR FORMING THE SAME

[75] Inventors: Phillip M. Hargus; Joseph A. Mula; Myron K. Redden, all of Hendersonville, N.C.

[73] Assignee: Alusuisse-Lonza Services, Ltd., Zurich, Switzerland

[21] Appl. No.: 349,317

[22] Filed: May 8, 1989

Related U.S. Application Data

[62] Division of Ser. No. 189,036, May 2, 1988, Pat. No. 4,866,011.

[51] Int. Cl.$^5$ .............................................. C04B 38/06
[52] U.S. Cl. ...................................... 501/81; 210/506; 210/510.1; 501/80; 501/82; 501/85; 501/88; 501/95
[58] Field of Search ............... 264/44; 210/510.1, 506; 501/80, 82, 81

[56] References Cited

U.S. PATENT DOCUMENTS

| | | | |
|---|---|---|---|
| 3,090,094 | 5/1963 | Schwartzwalder et al. | 264/44 |
| 3,877,973 | 4/1975 | Ravault | 264/44 |
| 3,939,002 | 2/1976 | Washburne | 301/81 |
| 4,004,933 | 1/1977 | Ravault | 264/44 X |
| 4,024,212 | 5/1977 | Dore et al. | 264/44 |
| 4,040,998 | 8/1977 | Nemeth . | |
| 4,083,905 | 4/1978 | Insley et al. . | |
| 4,396,565 | 8/1983 | Tomita et al. | 264/44 |

FOREIGN PATENT DOCUMENTS

| | | |
|---|---|---|
| 1388911 | 3/1975 | United Kingdom . |
| 2132603 | 7/1984 | United Kingdom . |

*Primary Examiner*—Karl Group
*Attorney, Agent, or Firm*—Bachman & LaPointe

[57] ABSTRACT

The present invention relates to a ceramic foam material, preferably a ceramic foam filter, prepared by providing an open cell flexible foam having a plurality of interconnected voids surrounded by a web of the flexible foam, applying an adhesion promoting material to at least one surface of the flexible foam, impregnating the flexible foam after applying the adhesion promoting material with a ceramic slurry, drying and heating the impregnated material to remove the organic component therefrom, and firing at an elevated temperature to form the filter. In a preferred embodiment, a flocked coating is formed on at least on surface of the flexible foam prior to impregnation. The flocked coating may be formed either by first applying a solution containing an adhesive to the surface(s) and thereafter applying fibers to the surface or by applying a solution containing the adhesive and the fibers.

6 Claims, 1 Drawing Sheet

CERAMIC FOAM AND A PROCESS FOR FORMING THE SAME

This is a division of application Ser. No. 189,036, filed May 2, 1988, now U.S. Pat. No. 4,866,011.

BACKGROUND OF THE INVENTION

The present invention relates to ceramic foam, especially ceramic foam filters and a process for manufacturing the same.

Porous ceramic foam materials are known in the art. These porous ceramic foam materials are known to be particularly useful in filtering molten metal, especially molten aluminum and aluminum alloys. U.S. Pat. Nos. 3,893,917, 3,947,363, 3,962,081, 4,024,056, 4,024,212, 4,075,303, 4,265,659, 4,342,644 and 4,343,704 describe some of the ceramic foam materials which have been used as filters.

Ceramic foam filters are typically produced by impregnating an open cell, hydrophobic flexible foam material with an aqueous slurry containing a ceramic material, squeezing the organic foam to remove excess slurry, using an air knife to open up any surface blockage, drying the impregnated foam and heating it to burn off the organic components, and firing the body at an elevated temperature to produce the filter. A wide variety of slurries have been used in an attempt to form a ceramic foam filter having considerable high temperature resistance and a structure resistant to degradation under the severe conditions of use associated with molten metal filtration. In U.S. Pat. No. 4,610,832, a molten metal filter is prepared using an aqueous slurry comprising a thixotropic ceramic composition including a gelled alumina hydrate. Co-pending U.S. Patent Application Ser. No. 125,943, filed Nov. 27, 1987, now abandoned, describes a ceramic foam filter prepared from a ceramic slurry containing a phosphate binder. Co-pending U.S. patent application Ser. No. 29,184, filed Mar. 23, 1987, now U.S. Pat. No. 4,885,263, describes a ceramic foam filter prepared from a ceramic slurry containing silicon carbide and a colloidal silica binder.

In some manufacturing processes, the ceramic slurry contains ceramic fibers. U.S. Pat. No. 4,265,659 illustrates one such process wherein ceramic fibers are added to a slurry containing alumina, chromia, bentonite, kaolin and an air settling agent. U.S. Pat. No. 4,391,918 also illustrates a process wherein a ceramic fiber material is added to the slurry. The fibers are intended to act as a crack growth inhibitor and thereby increase the strength of the filter element.

Flocked polyurethane foams are currently used for humidifiers and the like where the flocking acts to increase surface area. These types of foams are generally ill suited to the manufacture of ceramic foam filters because the extensive amount of flocking impedes slurry penetration.

Filters manufactured using polyurethane reticulated organic foams have encountered certain problems when the process involves certain types of slurries. Filters produced without supplemental processes such as spraying or dipping after impregnation can have weak or friable surfaces, poor edge quality or, in some cases, can be intrinsically weaker than desired for some applications. Processes including spraying or dipping after impregnation have been used in an attempt to improve the ceramic coating. Often, surfaces of the foam substrate have sharp projections which are difficult to coat. Moreover, the webs of the foam substrate are generally triangularly shaped and the peaks of the triangle especially may not be well covered. Spraying after impregnation however often creates an undesirable laminar effect. The sprayed layer is applied to a dried layer and the bonding is weak. Also, spraying can wash away some of the initial dried, impregnated slurry and weaken the structure. Spraying must, therefore, be carefully controlled adding to manufacturing complexity.

Accordingly, it is an object of the present invention to provide a ceramic foam having an improved ceramic coating.

It is a further object of the present invention to provide a ceramic foam filter as above wherein the slurry effectively coats the filter web.

It is still a further object of the present invention to provide a ceramic foam filter having improved mechanical properties.

It is yet a further object of the present invention to provide a process for forming the above ceramic foam filter.

These and other objects and advantages will become more apparent from the following description.

SUMMARY OF THE INVENTION

In accordance with the present invention the foregoing objects and advantages are readily obtained.

The present invention provides an improved ceramic foam, and preferably a ceramic foam filter, and process for preparing the same which is characterized by an improved coating and improved physical properties. The foregoing features are advantageously obtained without the need for supplemental processes such as spraying or dipping after impregnation.

The improved ceramic foam of the present invention is prepared by providing an open cell, preferably hydrophobic flexible foam material having a plurality of interconnected voids surrounded by a web of flexible foam material, applying an adhesion promoting material to at least one surface of the foam material, impregnating the foam material after applying the adhesion material with a preferably ceramic slurry, drying and heating the impregnated foam material to remove the organic component therefrom, and firing at an elevated temperature to form the final ceramic foam material. It has been found that adhesion between the flexible foam material and the slurry can be promoted by applying an adhesive coating to the flexible foam prior to slurry impregnation. It also has been found that applying an adhesive tends to increase the elasticity of the foam and make impregnation easier.

The adhesion promoting material may comprise an aqueous or alcohol solution containing any suitable adhesive known in the art. The solution may be a thin sprayable solution or a thick solution to be rolled into the foam. The solution may also contain organic or inorganic fibers for forming a flocked coating. It has been found that flocked coatings are particularly useful in that they increase the hydrophilicity and the surface area of the foam material with a resultant improvement in the ceramic coating. In an alternative embodiment of the present invention, a flocked coating is formed on at least one surface of the foam material prior to slurry impregnation by applying an adhesive containing solution to the surface(s) and thereafter applying a flocking by blowing or electrostatic deposition.

The ceramic foam material of the present invention comprises an open cell ceramic body having a plurality of interconnected pores defined by a ceramic web, said ceramic body prepared from an adhesive coated flexible, porous organic polymer foam impregnated with a ceramic slurry and fired at an elevated temperature. Preferably, the ceramic foam material is a ceramic foam filter and comprises an open cell ceramic body having a plurality of interconnected pores defined by a continuous ceramic web, said web having internal strengthening structures. In a preferred embodiment the internal strengthening structures are internal voids surrounded by ceramic.

Further features of the present invention will appear hereinbelow.

BRIEF DESCRIPTION OF THE DRAWINGS

The present invention will be more readily understood from a consideration of the accompanying drawings in which.

DETAILED DESCRIPTION

Figure 2:
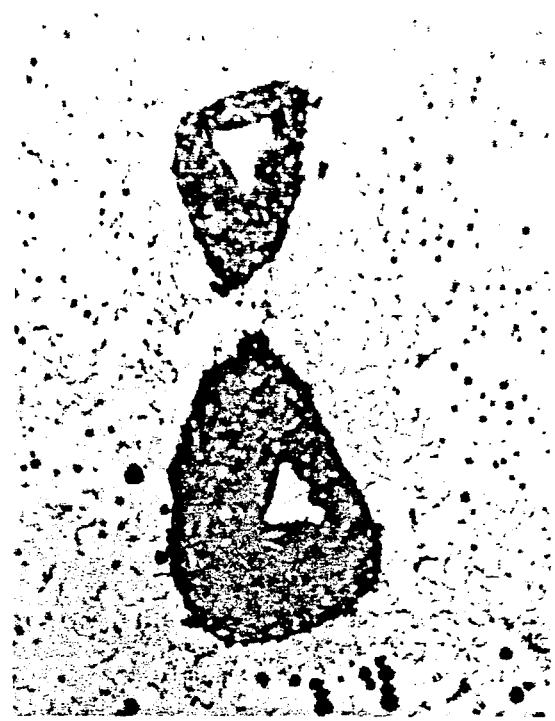
FIG. 2 is a photomicrograph at a magnification of 31× showing a cross-sectional view of a ceramic foam prepared in accordance with the present invention and including hollow strengthening structures adjacent the web.

In accordance with the present invention, a ceramic foam filter is prepared from an open cell, preferably hydrophobic, flexible foam material having a plurality of interconnected voids surrounded by a web of said flexible foam material. Typical materials which may be used include polymeric foams such as the preferred polyurethane and cellulosic foams. Generally, any combustible organic plastic foam may be used which has resilience and the ability to recover to original shape. The foam must burn out or volatilize at or below the firing temperature.

Generally, the flexible foam material is immersed in an aqueous ceramic slurry without any form of pretreatment. In accordance with the present invention, however, the flexible foam material is treated with an adhesive, and preferably a flocking material in addition to the adhesive, prior to immersion in the aqueous ceramic slurry in order to promote adhesion between the foam material and the ceramic slurry, improve the coating of the webs and increase the elasticity of the foam prior to impregnation. The application of the adhesive pre-treatment may wet the surface of the foam material with respect to the slurry thereby promoting adhesion between the slurry and the foam. As a result, a thicker ceramic coating having more complete coverage is formed on the foam. Previously, the sharp projections which exist on foam surfaces were generally thinly coated or uncoated. With the pre-treatment of the present invention, this problem is eliminated. Other advantages to the pre-treatment of the present invention include avoiding the need to apply a spray coating after slurry impregnation, an increase in the hydrophilicity of the foam material, a reduction in and virtual elimination of snowing by the ceramic foam product, and an increase in physical properties such as strength.

The adhesive pre-treatment of the present invention includes applying an adhesion promoting material to at least one surface of the foam. Generally, the adhesion promoting material will be applied to two opposed surfaces of the foam material. The adhesion promoting material may comprise any suitable adhesive known in the art. For example, the adhesive could be a heat setting adhesive or an air setting or contact adhesive. Generally, the adhesive will volatilize out at the temperatures to which the foam material is exposed during processing.

The adhesive material may be applied to the foam material in solution form. While aqueous solutions are preferred, alcohol based solutions may also be used. If the solution is thin, then it is preferred to apply it to the foam by spraying. However, if the solution is relatively thick, then it could be rolled into the foam. Generally, the adhesive material containing solution will have a viscosity in the range of from about 1,000 to about 80,000 centipoises, preferably from about 5,000 to about 40,000.

In a preferred pre-treatment, adhesion of the slurry to foam material is further promoted by applying a flocking to the foam material in addition to the adhesive material. The flocking may comprise organic or inorganic fibers. Organic fibers volatilize during heating in a manner analogous to the volatilization of the foam material. Organic fibers can include, but are not limited to, natural organic fibers such as cotton or wood fibers and synthetic organic fibers such as rayon, nylon or acrylic fibers. Inorganic fibers will not volatilize during firing of the ceramic and are generally coated with the slurry of the ceramic. The inorganic fibers could include, but are not limited to, fiberglass, alumina fibers, alumino-silicate fibers, silicon carbide fibers, zirconia fibers and carbon or graphite fibers. The lengths of the fibers can be varied according to the pore size of the foam material from "short" to "medium" to "long". Generally, the fibers are less than about $\frac{1}{8}''$ in length. The amount of fiber applied can also be varied.

The flocking may be applied either as part of the adhesion containing solution or following the application of the adhesive material. For example, a flocked coating may be formed by applying the adhesive solution to a first surface, applying the flocking to the first surface while the adhesive coating is in a tacky condition, drying the surface, reversing the foam material and repeating the treatment on the opposed surface. The treatment may also be applied to the foam edges. If needed heat may be applied to the adhesively coated surface to make it tacky prior to application of the flocking. Vehicles to carry the fiber during flocking and binders to hold them in place may be used if needed. The vehicles and/or binders can also include organics or inorganics or combinations thereof. Possible organics could include air setting glues. Inorganics could include silicate binders or phosphate binders.

The flocking when applied separately may be applied using any suitable technique known in the art. For example, the flocking may be applied mechanically using an air blower or beater bar, by electrostatic deposition, or by a combination of both. When applying the flocking, it is important that the flocking not reduce the area of the pores more than about 35%. To this end, excess fibers may be removed by suction or by blowing.

One of the advantages of the present invention is that one can adhesively coat or flock either surfaces only or throughout, depending of course on pore size with respect to the flocking. Naturally, when pore sizes become finer, ability for bulk flocking becomes limited. Other advantages of applying the adhesive coating or the flocking are believed to include an increase in the elasticity of the foam which renders it easier to impregnate and easier to cut to size. Higher elasticity foams are easier to impregnate because there is more spring back during rolling which aides the coating process and aids in maintaining the dimensional stability of the foam.

After the adhesive or flocked coating has been applied, the foam material is impregnated with a ceramic slurry. Preferably, an aqueous ceramic slurry is employed which is thixotropic, has a relatively high degree of fluidity and is comprised of an aqueous suspension of the desired ceramic material. Any suitable ceramic slurry having the above characteristics, for example a slurry containing silicon carbide, may be used.

When a silicon carbide slurry is used to form the filter, the silicon carbide component preferably has a grain size of −325 mesh, i.e. less than 45 microns; however one can readily utilize silicon carbide with a grain size of −100 mesh, i.e. 150 microns or less. The ability to use fine grain size ceramic material, such as process fines of 10 microns or less, represents a significant advantage particularly in view of cost considerations. The solids content of the composition must be at least 50% silicon carbide.

One can readily employ additional ceramic materials in combination with the silicon carbide component. Alumina is a particularly preferred additive and when used should be used with a grain size of −325 mesh, i.e. less than 45 microns. Naturally, other ceramic materials may readily be employed such as alumina zirconia, zirconia toughened alumina, zirconia plus alumina, partially stabilized zirconia, chromia, magnesia, cordierite, mullite, etc.

The silicon carbide slurry also generally includes a binder, which is preferably a colloidal silica binder which is used as an aqueous dispersion of particles using from 10 to 50% water. The colloidal dispersion is a stable, nonsettling suspension with a particle size of 1 micron or less. The colloidal silica component provides the binder and due to the colloidal nature of the dispersion aids in obtaining a desirable thixotropy.

Naturally, other additives may be employed either as an additional binder or for other desirable reasons preferably, for example, one may readily use montmorillonite, Aquathix which is a trademark of Tenneco Chemicals for a water soluble polysaccharide, bentonite, kaolin and the like.

Detailed procedures for preparing ceramic foam for molten metal filters are described in U.S. Pat. Nos. 3,962,081, 4,075,303 and 4,024,212, the disclosures of which are hereby incorporated by reference herein.

Briefly, the flexible foam material is impregnated with the aqueous ceramic slurry so that the fiber-like webs are coated therewith and the voids are filled therewith. Normally, it is preferred to simply immerse the foam in the slurry for a short period of time sufficient to insure nearly complete impregnation of the foam. The pore size of the polymeric foam material may conveniently be three pores per inch or smaller. The pore sizes in the range of 3-25 pores per inch have been found to be particularly advantageous for iron and iron base alloy filtration in view of the higher total material throughput, although one could readily utilize smaller pore sizes, up to 50 ppi, for example.

The impregnated foam is then compressed to expel a portion of the slurry while leaving the fiber-like web portion coated therewith and with a plurality of blocked pores throughout the body to increase flow path tortuosity, i.e. homogeneously distributed throughout the ceramic body rather than grouped together. For those cases in which maximum throughput with a lesser degree of filtration is desirable, a relatively coarse pore size with very few pore blockages is preferred. In a continuous operation, for example, one may pass the impregnated foam through a preset roller to effect the desired expulsion of the slurry from the foam and leave the desired amount impregnated therein. Naturally, this may be done manually by simply squeezing the flexible foam material to the desired extent. At this stage, the foam is still flexible and may if desired be formed in configurations for suitable filtration tasks, i.e., into curved plates, hollow cylinders, etc. It is necessary to hold the formed foam in position by conventional means until the structure is dried or organic substrate is disposed. The impregnated foam is then dried by any suitable means, such as air drying, accelerated drying at a temperature of from 100° to 700° C. for from 15 minutes to 6 hours, or by microwave drying. Air drying may be achieved in from 8 to 24 hours. After drying the material is fired at an elevated temperature to form the ceramic foam filter. Temperatures are determined by the particular composition being fired and are, for example, often in excess of 2000° F. and up to 3100° F. After firing, the resultant product is preferably characterized by a plurality of blocked pores substantially homogeously distributed throughout the structure. Firing time at or near the peak temperature is at least 15 minutes and generally at least 1 hour and generally less than 10 hours. Total firing times including heating to and cooling from the peak temperature can, of course, vary widely depending on the type furnace used.

The resultant product is as characterized hereinabove and has significant advantages as discussed hereinabove. The coated fibers are believed to act as reinforcing sites which impart to the filter superior strength properties without significantly increasing the weight of the filter. Filters formed in accordance with the present invention exhibit an increase in strength of about 25-50% above untreated material. The filters also exhibit improved edge quality and substantially no snowing. It has been found that filters formed in accordance with the present invention have about a 90% reduction in snowing as compared to filters formed using other techniques.

Naturally, additional inorganic additives may readily be used in order to obtain particularly preferred properties, such as for example, sintering aids, grain growth inhibitors or inorganic rheological aids. Other organic additives may also be beneficially employed including, for example, temporary binders and rheological aids.

In accordance with the present invention, the specific features will be more readily understandable from a consideration of the following examples.

EXAMPLE 1

Polyurethane panels each about 50 mm×75 mm in cross section and 22 mm deep having a pore size in the range of 3-5 ppi were provided. An aqueous solution containing a commercially available heat setting, water soluble latex adhesive at a concentration of about 50 v/o was prepared. A flocked coating was formed on each panel by spraying the adhesive solution on a first surface to provide a tacky surface, spraying a flocking onto said tacky surface, setting the adhesive in an oven at a temperature of 125° F. for 15 minutes and thereafter repeating the treatment on a second surface opposed to the first. The flocking treatments applied to the surfaces consisted of one of short cotton fibers, one of middle-sized acrylic fibers, one of middle-sized nylon fibers and one of long rayon fibers. The fibers were electrostatically charged by spinning in a spray gun cannister. Certain but not all of the panels were subjected to a suction and blowing treatment to remove excess fibers and thereby insure a reduction in pore area of less than about 35%.

An aqueous slurry of a thixotropic ceramic composition including silicon carbide with a colloidal silica binder was prepared. The composition of the slurry was about 65% silicon carbide, 25% $Al_2O_3$, 9% colloidal silica and 1% montmorillonite. Each of the panels were then impregnated with the slurry. Impregnation was accomplished by immersing the foam panels in the slurry and using preset rolls to compress the foam and expel a portion of the slurry while leaving the fiber-like web portion coated therewith and with a plurality of blocked pores throughout the body to increase flow path tortuosity.

The resultant impregnated foams were dried and heated to remove the organic components therefrom i.e., web, adhesive and flocking, with firing at approximately 2150° F. for 1 hour. The resultant ceramic foam samples prepared from flocked foam as described above were characterized by better edge and surface quality than comparison standards prepared from untreated foam. The best results were obtained with the cotton and acrylic fibers. Further, those samples with pore blockage over about 35% were too blocked and those with pore blockage less than about 35% were good.

EXAMPLE 2

In this example, polyurethane panels of different dimensions and different pore sizes were used to prepare ceramic foam products in accordance with the present invention. The panels each had a thickness of ⅞" and a cross section of either 2"×3", 3"×4" or 4"×4". Further, each different sized panel came in pore sizes of 15 ppi and 20 ppi.

Each panel was pre-treated to form a flocked coating on two opposed surfaces. The coating was formed as in Example 1 using only short cotton fibers. Each panel was then impregnated with a monoaluminum phosphate bonded alumina slurry by immersing each panel in the slurry and using preset rolls to compress the foam and expel a portion of the slurry while leaving the flocked web portion coated therewith. The impregnated panels were dried and heated to remove organic components therefrom by firing at approximately 2150° for 1 hours.

While ceramic foam products without the flocked coating pre-treatment normally flake or snow, the products formed in this example exhibited no flaking or snowing. Further, the products exhibited a dramatic improvement in the ability to be saw cut to size after firing. Still further, the products exhibited a pore blockage below about 35%.

EXAMPLE 3

Polyurethane panels having a cross section of 2"×3", a thickness of ⅞" and a pore size of 15 ppi had a short cotton flocked coating formed on two opposed surfaces using the procedure of Examples 1 and 2. The panels with the flocked coating were then immersed in a slurry containing zirconia, alumina and boehmite gel and formed into ceramic foam products using the technique outlined in Examples 1 and 2, except that in this case the dried, impregnated foam was fired to 1620° C. (2950° F.) for about 8 hours rather than 1177° C. (2150° F.) as in Examples 1 and 2.

The products thus formed exhibited an improved ability to be saw cut after firing and as before and no flaking. The ceramic foam products were in fact sliced into a plurality of thin slices without any difficulty.

EXAMPLE 4

Polyurethane discs having diameters of 3" and 4", with an 18° bevel, a thickness of ¾" and a pore size of 10 ppi were prepared in a manner after Example 2 with a flocked coating formed on two opposed surfaces. The discs with flocked coating were then immersed in a slurry containing alumina and boehmite gel and formed into ceramic foam products using the technique outlined in Example 3, the resultant ceramic foam products were as strong or stronger than one prepared from unflocked foam using a spray coating step after impregnation and drying. Thus, the instant process without a spray coating step achieves a lower cost, high quality product.

EXAMPLE 5

Filters produced in accordance with Example 1 were tested for mechanical strength. Twenty, three point bend tests were run using 50 mm ×75 mm ×22 mm specimens. The average breaking load was calculated and compared to the average for non-flocked foam. Short cotton fibers, middle-sized acrylic fibers, middle-sized nylon fibers and long rayon fibers were used. The resultant strengths are shown below, wherein the material prepared in accordance with the present invention all showed a breaking load in excess of 100 pounds.

| | |
|---|---|
| short cotton fibers | 103 lbs. breaking load |
| middle acrylic fibers | 146 lbs. breaking load |
| middle nylon fibers | 102 lbs. breaking load |
| long rayon fibers | 102 lbs. breaking load |
| unflocked | 70 lbs. breaking load |

Figure 1:
FIG. 1 is a photomicrograph at a magnification of 13× showing a cross-sectional view of a ceramic foam prepared in accordance with the present invention.

It is believed that this surprising strengthening is due to the internal web structure and the surrounding of the web developed by the flocking. These features are clearly shown in the attached photomicrographs. FIG. 1 shows a cross-section view at a magnification of 13× of two (2) webs of a ceramic foam filter prepared in accordance with the present invention and after impregnation with iron. The central, triangularly-shaped core would be hollow in the final ceramic foam product. FIG. 1 clearly shows the excellent ceramic coverage of the web in accordance with the present invention. FIG. 2 shows a cross-sectional view at a magnification of 31 × of a web of a ceramic foam filter prepared in accordance with the present invention and after impregnation with iron. Here again, the core would be hollow in the final ceramic foam product. The three (3) circular structures surrounding the core show sites of flocked fibers which form strengthening structures in the final ceramic foam. The flocked fibers have decomposed together with the decomposition of the organic web and the adhesive to form the hollow strengthening structures adjacent the hollow web, as clearly shown in FIG. 2. In addition, FIG. 2 clearly shows the excellent ceramic coverage of the web and the fibers in accordance with the present invention.

Figure 3:
FIG. 3 is a photomicrograph at a magnification of 40× showing a cross-sectional view of a ceramic foam without the treatment of the present invention.

The excellent ceramic coverage of the web in accordance with the present invention as shown by FIGS. 1 and 2 should be sharply contrasted with FIG. 3. FIG. 3 shows a cross-sectional view at a magnification of 40× of a web of a ceramic foam filter prepared in a manner after Example 1, but without any adhesive treatment and without any fiber treatment. It can be clearly seen from FIG. 3 that the sharp projections on the generally triangularly shaped, web are either thinly coated or uncoated, in contrast to the excellent ceramic coverage in accordance with the present invention.

It is apparent that there has been provided in accordance with this invention a ceramic foam filter and a process for manufacturing the same which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and "broad scope of the appended claims."

What is claimed is:

1. A ceramic foam filter which comprises:
an open cell ceramic body having a plurality of interconnected pores defined by a ceramic material;
a plurality of internal strengthening structures incorporated into said ceramic material created by decomposition of a flocking material applied to an organic polymer foam during a subsequent firing treatment; and
external surfaces of said body being defined by said ceramic material,
said ceramic body with said internal strengthening structures being prepared from a flexible, porous organic polymer foam coated with an adhesion promoting material and said flocking material, impregnated with a ceramic slurry, and fired at an elevated temperature.

2. A ceramic foam material which comprises:
an opened cell ceramic body having a plurality of interconnecting pores defined by a ceramic web;
said web having internal strengthening structures incorporated therein for improving the strength of said ceramic foam material;
said internal strengthening structures being created by decomposition of a flocking material applied to an organic polymer foam during a firing treatment; and
said ceramic foam material having a pore blockage of less than 35%.

3. A ceramic foam material according to claim 2 in the form of a molten metal filter.

4. A ceramic foam material according to claim 2 wherein said ceramic body is selected from the group consisting of silicon carbide, alumina, zirconia, zirconia plus alumina, zirconia toughened alumina, partially stabilized zirconia, chromia magnesia, cordierite and mullite.

5. A ceramic foam material according to claim 2 wherein said foam material has a breaking load in excess of 100 lbs.

6. A ceramic foam material according to claim 2 wherein external surfaces are defined by said ceramic web.

* * * * *